US009828475B2

(12) United States Patent
Beyer et al.

(10) Patent No.: US 9,828,475 B2
(45) Date of Patent: *Nov. 28, 2017

(54) PRINTABLE MONOLAYER POLYVINYLIDENE CHLORIDE STRUCTURES

(75) Inventors: Douglas E. Beyer, Midland, MI (US); Steven R. Jenkins, Sanford, MI (US); William R. LaFollette, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 893 days.

This patent is subject to a terminal disclaimer.

(21) Appl. No.: 12/941,609

(22) Filed: Nov. 8, 2010

(65) Prior Publication Data
US 2011/0124780 A1 May 26, 2011

Related U.S. Application Data

(60) Provisional application No. 61/263,157, filed on Nov. 20, 2009.

(51) Int. Cl.
C08J 5/18 (2006.01)
B41M 1/30 (2006.01)
C08L 27/08 (2006.01)
C08K 5/00 (2006.01)
C08K 5/11 (2006.01)
C08L 27/06 (2006.01)
C08L 33/12 (2006.01)
C08L 33/10 (2006.01)
C08L 33/08 (2006.01)

(52) U.S. Cl.
CPC ............. C08J 5/18 (2013.01); B41M 1/30 (2013.01); C08L 27/08 (2013.01); C08J 2327/08 (2013.01); C08K 5/0016 (2013.01); C08K 5/11 (2013.01); C08L 27/06 (2013.01); C08L 33/08 (2013.01); C08L 33/10 (2013.01); C08L 33/12 (2013.01)

(58) Field of Classification Search
CPC .......... C08L 33/08; C08L 33/10; C08L 33/12; C08L 27/08; C08L 27/06; C08L 2666/04; C08J 2327/08; C08J 5/18; C08K 5/0016; C08K 5/11; B41M 1/30
USPC ......................................................... 524/114
See application file for complete search history.

(56) References Cited

U.S. PATENT DOCUMENTS

| 2,064,565 | A | | 12/1936 | Reid |
| 2,075,429 | A | | 3/1937 | Douglas |
| 3,275,716 | A | | 9/1966 | Wiggins |
| 5,202,188 | A | | 4/1993 | Bekele |
| 5,512,337 | A | * | 4/1996 | Littmann et al. ............ 428/35.4 |
| 5,538,770 | A | | 7/1996 | Bekele |
| 5,679,465 | A | | 10/1997 | Bekele |
| 5,726,229 | A | | 3/1998 | Bekele |
| 5,759,702 | A | | 6/1998 | Bekele |
| 5,914,194 | A | | 6/1999 | Bekele |
| 6,627,679 | B1 | | 9/2003 | Kling |
| 6,713,105 | B1 | | 3/2004 | Bekele |
| 7,754,300 | B2 | * | 7/2010 | Beyer et al. .................. 428/34.8 |
| 8,309,634 | B2 | * | 11/2012 | Beyer et al. .................. 524/114 |

FOREIGN PATENT DOCUMENTS

| EP | 0029316 | 5/1981 |
| EP | 0530622 | 3/1993 |
| EP | 0604136 | 6/1994 |
| EP | 0707957 | 4/1996 |
| EP | 0712896 | 5/1996 |
| EP | 0854894 | 7/1998 |
| JP | 2003-026882 A | 1/2003 |
| WO | 9714554 | 10/1995 |
| WO | 9748753 | 12/1997 |
| WO | 2006044113 A1 | 4/2006 |
| WO | 20060441113 | 4/2006 |

OTHER PUBLICATIONS

Flexography Principles and Practices, 4th edition, published by the foundation of the Flexography Technical Association, pp. 354-358 (1991).

* cited by examiner

Primary Examiner — Angela C Scott

(57) ABSTRACT

The present invention includes a polymer composition of at least one vinylidene chloride/alkyl acrylate polymer having from about 3.4 to about 6.7 percent mole percent of mer units derived from at least one alkyl acrylate monomer polymerized with the vinylidene chloride and comprising a plasticizer and having at least one of the following compositional characteristics (1) and (2): (1) at least one low molecular weight vinyl chloride polymer having a molecular weight of at most about 70,000 Daltons in an amount sufficient to increase affinity for at least one ink; and (2) at least one methacrylic polymer in an amount sufficient to increase the affinity for at least one ink. Surfaces comprising such a composition and articles having such surfaces are surprisingly printable and are aspects of the invention as is printing thereon.

14 Claims, No Drawings

PRINTABLE MONOLAYER POLYVINYLIDENE CHLORIDE STRUCTURES

CROSS-REFERENCE TO RELATED APPLICATIONS

This application claims priority from U.S. provisional application Ser. No. 61/263,157, filed Nov. 20, 2009, which is incorporated herein by reference in its entirety.

BACKGROUND

Field of the Invention

This invention relates to vinylidene chloride polymer articles and structures and their printability, as well as the related compositions and processes.

Compositions comprising vinylidene chloride polymers, where the vinylidene chloride is polymerized with vinyl chloride or with esters such as methyl, ethyl, propyl and butyl acrylates are well known. While monolayer films of polymers of vinylidene chloride with vinyl chloride have long been used, polymers of vinylidene chloride and acrylate esters were generally used as inner layers of multilayer structures until recent developments such as those disclosed in WO 2006044113. In multilayer structures, a layer more amenable to printing than vinylidene chloride/alkyl acrylate polymers is generally used as an outer layer when printability is desired. Vinylidene chloride/vinyl chloride copolymers used in monolayer films are generally printable with commercially available inks without need for special additive considerations.

Now that vinylidene chloride/alkyl acrylate polymers are being used in monolayer films, especially in packaging, it would be desirable for such films to be more amenable to printing than has been observed in films of the vinylidene chloride/alkyl acrylate compositions. It would be desirable to find vinylidene chloride/alkyl acrylate copolymer compositions, films and articles that exhibit printability similar to that of commercially available vinylidene chloride/vinyl chloride copolymers for use in monolayer films, similarly produced, for instance, by a double bubble process. Specifically, it would be desirable to have vinylidene chloride/alkyl acrylate polymer compositions with affinity to inks of a wide variety of compositions. It would, therefore, be desirable to have an additive or additive package for polyvinylidene chloride compositions, especially compositions comprising copolymers of vinylidene chloride and methyl acrylate, which additive or package would improve printability, affinity or adhesion to ink sufficiently to render them more suitable for such applications as printed packages and other printed materials. Increased affinity for ink would preferably allow use of a wider variety of inks, preferably including at least one non-aqueous or solvent based ink, more preferably at least one ink of low viscosity relative to lithographic ink. Relative desirability of inks depends on the application and may include at least one of reduced cost, compatibility with certain equipment, enhanced appearance, familiarity, compatibility with some later process such as recycling and the like.

SUMMARY OF THE INVENTION

It has now been found that compositions of at least one vinylidene chloride/alkyl acrylate polymer having from about 3.4 to about 6.7 mole percent of mer units derived from at least one alkyl acrylate monomer polymerized with the vinylidene chloride and comprising a plasticizer and one or both of the following compositional characteristics (1) and (2): (1) at least one methacrylic polymer in an amount sufficient to increase the affinity for at least one ink; and (2) at least one low molecular weight vinyl chloride polymer having a molecular weight of at most about 70,000 Daltons in an amount sufficient to increase affinity for at least one ink; which compositions are useful to make monolayer films more printable than a film of the same physical dimensions and vinylidene chloride copolymer composition but without either of those 2 compositional characteristics. It is surprising that these compositional characteristics result in improved printing. The methacrylic polymers are reported to decrease adhesion to metals in such references as U.S. Pat. No. 5,202,188 and U.S. Pat. No. 5,759,702 and is referred to as a lubricating agent in such references as U.S. Pat. No. 5,679,465. Low molecular weight vinyl chloride polymers are reported for use in improving the strength of bags and their seals in U.S. Pat. No. 3,275,716. Epoxidized soybean oil has been used in larger concentrations in vinylidene chloride/vinyl chloride polymer films that adhere satisfactorily to low viscosity inks.

a. In the first aspect, this invention is a polymer blend comprising
  (a) at least one vinylidene chloride polymer/alkyl acrylate interpolymer having at most about 6.7 mole percent alkyl acrylate mer units in the polymer; and
  (b) a plasticizer; and
  (c) at least one of
    (1) at least one methacrylic polymer preferably formed from a monomer composition (that is, having mer units originating from a monomer composition) consisting essentially of alkyl methacrylate ester monomers, alkyl acrylate ester monomers, styrenic monomers or a combination thereof in an amount sufficient to achieve better affinity for ink than is achieved in its substantial absence; and
    (2) at least one low molecular weight vinyl chloride polymer having a molecular weight of at most about 70,000 Daltons in an amount sufficient to achieve better affinity for ink than is achieved in its substantial absence The composition optionally includes additives in addition to those listed; however, the weight percentages are those determined from the weight of the vinylidene chloride interpolymer and the listed types of additives, when present, including more than one of one or more of each type plasticizer, low molecular weight vinyl chloride polymer, methacrylate polymer or combination thereof.

In a second aspect, the invention includes monolayer films made from the composition according to the practice of the invention and articles comprising the film, particularly printed films and articles. In a third aspect the invention includes multilayer films having an outside or external layer comprising a composition according to the practice of the invention and articles comprising the film, particularly printed films and articles. In the second and third aspects, the articles are preferably packages or parts thereof, such as overwrap, sausage casings, bags, and other containers. Additionally, the invention includes an article having a surface wherein at least a portion of the surface comprises a composition according to the practice of the invention. In yet another aspect, the invention is a polymer surface comprising at least one composition according to the practice of the invention preferably having ink thereon, preferably with the ink dry, more preferably in the form of printing.

In another aspect, this invention includes a process for forming a film or article comprising blowing a film or blow molding an article from a composition of the invention.

DRAWINGS

There are no drawings

DETAILED DESCRIPTION OF THE INVENTION

Definition of Terms

The term "printing" as used herein refers to any process of applying ink to a surface such that any intentional design, for instance, one or more symbols, letters, numbers, pictures or the like remains on the surface. In the practice of the invention, flexographic or rotogravure printing is preferred.

In rotogravure printing, the ink is applied directly to the cylinder and from the cylinder it is transferred to the substrate. The cylinders rotate in an ink bath where each cell of the design is flooded with ink. A doctor blade is angled against the cylinder to wipe away the excess ink, leaving ink only in the cell wells. The pressure from impression rollers draw/force the ink out of the cell cavity and transfer it to the substrate.

In flexographic printing, the ink is applied from a plate cylinder to the substrate. Pressure from an impression or backup roller forces the substrate into contact with the ink covered plate cylinder. The ink transfers to the substrate because of a difference between the surface tension of the liquid ink and the surface energy of the substrate. A metering cylinder known as an anilox roll applies ink to the plate cylinder. The anilox roll rotates in an ink pan. In some cases, a doctor blade is used to remove excess ink from the anilox roll.

The term "ink" as used herein refers to a fluid composed of colorants and vehicles. The colorant is a dye or pigment. The vehicle is the portion of the ink that carries the colorant from the ink reservoir to the substrate. The vehicle optionally includes resins, additives, and solvents. In the practice of the invention the ink is preferably a solvent based ink, as contrasted with an aqueous ink where the fluid component is aqueous. The vehicle resin is dissolved in the vehicle solvent. The solvent is removed during drying and the resin binds the colorant to the substrate. It is used for writing, printing and the like. Flexographic inks are very similar to gravure printing inks used in packaging. They are fast drying and have a low viscosity, that is, viscosity lower than the viscosity of common lithographic inks. These inks are formulated to lie on the surface of nonabsorbent substrates and solidify when solvents are removed. Solvents are removed with heat, often hot convection air, applied between printing units and in a tunnel dryer after the last printing unit. Such flexographic and gravure inks are preferred in the practice of the invention.

The term "affinity for ink" or "adhesion to ink" as used herein describes the property of a surface, namely the ability to hold ink or the tendency of the ink to stay on the surface, especially in the presence of rubbing or other means that might remove it. Test procedures are described in *Flexography Principles and Practices,* 4th edition, published by the foundation of the Flexographic Technical Association, pages 354-358 (1991). Tape adhesion tests, scratch and rub resistance tests are used. Tests particularly appropriate for the current invention are described in more detail hereinafter in the examples of the invention. For a test to accurately reflect differences in affinity for or adhesion to ink, the ink used for testing should not, itself, have sufficient affinity for the surface to be printed to mask differences in surface affinity. Preferably, the ink used for testing will exhibit at most about 80 percent adhesion to the surface to be tested having least affinity for that ink, otherwise measuring relative performance is difficult.

The term "plasticizer" as used herein refers to a substance or material incorporated into a polymer composition to increase the flexibility, pliability or softness of the polymer or a final product made from it, for instance a film or fiber. Usually, a plasticizer lowers the glass transition temperature of the plastic, making it softer. However, strength and hardness often decrease as a result of added plasticizer.

"Film" refers to a sheet, non-woven or woven web or the like or combinations thereof, having length and breadth dimensions and having two major surfaces with a thickness therebetween. A film can be a monolayer film (having only one layer) or a multilayer film (having two or more layers). A multilayer film is composed of more than one layer preferably composed of at least two different compositions, advantageously extending substantially the length and breadth dimensions of the film. Layers of a multilayer film are usually bonded together by one or more of the following methods: lamination, coextrusion, extrusion coating, vapor deposition coating, solvent coating, emulsion coating, or suspension coating. A film, in most instances, has a thickness of up to about 20 mils ($5 \times 10^{-4}$ m). The term film as used herein to describe the present invention is also inclusive of a coating.

"Layer" means herein a member or component forming all or a fraction of the thickness of a structure wherein the component is preferably substantially coextensive with the structure and has a substantially uniform composition.

The term "monolayer film" as used herein means a film having substantially one layer. Optionally, however, more than one ply of monolayer film is used in an application with or without one or more adhesives between adjacent plies. Thus, a film is considered monolayer if it is formed in a process considered in the art to be a monolayer process, for instance, formed by a double bubble process rather than a coextrusion process, even if two layers of a composition according to the practice of the invention are used adjacent to one another or even with an adhesive between the layers. When adhesive is used, each occurrence commonly has a thickness of at most about 10 percent, preferably at most about 5 percent of the total thickness of the structure of which it is a part. For purposes of this invention, a film that is monolayer when produced is considered monolayer even when it is used in packaging that may involve adjacency, adherence, or both to other materials.

"Extrusion," and "extrude," refer to the process of forming continuous shapes by forcing a molten plastic material through a die, followed by cooling or chemical hardening. Immediately prior to extrusion through the die, the relatively high-viscosity polymeric material is fed into a rotating screw, which forces it through the die.

"Coextrusion," and "coextrude," refer to the process of extruding two or more materials through a single die with two or more orifices arranged so that the extrudates merge and weld together into a laminar structure before cooling or chilling, that is, quenching. Coextrusion is often employed as an aspect of other processes, for instance, in film blowing, casting film, and extrusion coating processes.

The term "surface" is used to mean an outer face or exterior of an object, a boundary of a three-dimensional figure (including a film). For the purposes of this invention, a portion of the entire surface of an object is also referred to as a surface. Furthermore, for the purposes of describing the present invention, the term surface will apply even after a once-exposed surface has received printing or possibly a coating, for instance over an ink, with the exception that exposed surfaces (that is, before such coatings) should be used for tests for affinity for or adhesion to ink. Similarly, when a surface is coated with a composition according to the practice of the invention before being printed, the outer boundary of that coating is referred to as the surface for purposes of the invention and should be used for testing relative affinity for ink.

The term "processing aid" as used herein refers to additives useful to improve extrusion of a polymer to form a film or other shape, thus extrusion processing aids.

"Molecular weight" is used herein to designate the weight average molecular weight in Daltons. It is measured, for instance, in the case of vinylidene chloride polymers, by size exclusion chromatography using polystyrene calibration. Sample preparation includes dissolving a polyvinylidene chloride resin sample in tetrahydrofuran (THF) at 50° C. Resin samples containing more than about 94 percent vinylidene chloride do not readily dissolve at this temperature, and dissolving at elevated temperature can result in degradation of the polymer molecular weight. Therefore, resin samples containing more than about 94 percent vinylidene chloride are pre-dissolved as a 1 percent (%) solution, in inhibited THF at 63° C. Samples can be dissolved at up to 83° C. for 4 hours without loss of molecular weight, though minimizing dissolving time and temperature is desirable. The polymers are then analyzed for determination of molecular weight by gel permeation chromatography (GPC) using the Polymer Laboratories Software on a Hewlett Packard 1100 chromatograph equipped with two columns in series. These columns contain 5 µm styrene/divinylbenzene copolymer beads commercially available from Polymer Laboratories under the trade designation PLGel 5µ MIXED-C. The solvent is nitrogen purged HPLC Grade THF. The flow rate is 1.0 milliliter/minute and the injection size is 50 microliters. The molecular weight determination is deduced by using ten narrow molecular weight distribution polystyrene standards (commercially available from Polymer Labs under the trade designation Narrow PS set (~3,000,000 to 2000 Mp)) in conjunction with their elution volumes. Other methods are well within the skill in the art. When polymers are commercially available, molecular weights given in suppliers' literature is generally accepted.

As used herein, the term "mer unit" means that portion of a polymer derived from a single reactant molecule, a single monomer molecule; for example, a mer unit from ethylene has the general formula —$CH_2CH_2$—.

As used herein "polymer" is a molecule having repeating mer units from about 100 or more monomer molecules, which molecules are optionally the same or different.

"Interpolymer" or "Copolymer" refers to a polymer that includes mer units derived from at least two reactants (normally monomers) and is inclusive of random, block, segmented, graft, etc., copolymers, as well as terpolymers, tetrapolymers, and trimers and oligomers.

As used herein, the term "PVDC" designates polyvinylidene chloride copolymers. Common PVDC copolymers include vinylidene chloride/vinyl chloride copolymer and vinylidene chloride/alkyl acrylate copolymer.

All percentages, preferred amounts or measurements, ranges and endpoints thereof herein are inclusive, that is, "less than about 10" includes 10 and about 10. "At least" is, thus, equivalent to "greater than or equal to," and "at most" is, thus, equivalent "to less than or equal to." Unless stated otherwise, numbers herein have no more precision than stated. Thus, "115" includes at least from 114.5 to 115.49. Furthermore, all lists are inclusive of combinations of two or more members of the list. All ranges from a parameter described as "at least," "greater than," "greater than or equal to" or similarly, to a parameter described as "at most," "up to," "less than," "less than or equal to" or similarly are preferred ranges regardless of the relative degree of preference indicated for each parameter. Thus, a range that has an advantageous lower limit combined with a most preferred upper limit is a preferred range for the practice of this invention. All amounts, ratios, proportions and other measurements are by weight unless stated otherwise, implicit from the context, or customary in the art. All percentages refer to weight percent based on total composition according to the practice of the invention unless stated otherwise, implicit from the context, or customary in the art. Except in the examples, or where otherwise indicated, all numbers expressing quantities, percentages, OH numbers, functionalities and so forth in the specification are to be understood as being modified in all instances by the term "about." Unless stated otherwise or recognized by those skilled in the art as otherwise impossible, steps of processes described herein are optionally carried out in sequences different from the sequence in which the steps are discussed herein. Furthermore, steps optionally occur separately, simultaneously or with overlap in timing. For instance, such steps as heating and admixing are often separate, simultaneous, or partially overlapping in time in the art. Unless stated otherwise, when an element, material, or step capable of causing undesirable effects is present in amounts or in a form such that it does not cause the effect to an unacceptable degree it is considered substantially absent for the practice of this invention. Furthermore, the terms "unacceptable" and "unacceptably" are used to refer to deviation from that which can be commercially useful, otherwise useful in a given situation, or outside predetermined limits, which limits vary with specific situations and applications and can be set by predetermination, such as performance specifications. Those skilled in the art recognize that acceptable limits vary with equipment, conditions, applications, and other variables but can be determined without undue experimentation in each situation where they are applicable. In some instances, variation or deviation in one parameter can be acceptable to achieve another desirable end.

The term "comprising", is synonymous with "including," "containing," or "characterized by," is inclusive or open-ended and does not exclude additional, unrecited elements, material, procedures or steps, whether or not the same are disclosed herein. The term "consisting essentially of" indicates that in addition to specified elements, materials, procedures or steps; unrecited elements, materials procedures or steps are optionally present in amounts that do not unacceptably materially affect at least one basic and novel characteristic of the subject matter. The term "consisting of" indicates that only stated elements, materials, procedures or steps are present except to an extent that has no appreciable effect, thus are substantially absent.

The term "or", unless stated otherwise, refers to the listed members individually as well as in any combination of some or all of the listed members.

Expressions of temperature are optionally in terms either of degrees Fahrenheit (° F.) together with its equivalent in degrees centigrade (° C.) or, more typically, in degrees centigrade (° C.) alone.

The present invention involves compositions of at least one vinylidene chloride polymer. Vinylidene chloride polymers (also known as vinylidene chloride resins, interpolymers of vinylidene chloride, vinylidene chloride interpolymers, copolymers of vinylidene chloride, and PVDC) are well-known in the art. See, for example, U.S. Pat. Nos. 3,642,743 and 3,879,359. As used herein, the term "interpolymer of vinylidene chloride," vinylidene chloride interpolymer" or "PVDC" encompasses copolymers, terpolymers, and higher polymers wherein the major component is vinylidene chloride, optionally and preferably having one or more mono-ethylenically unsaturated monomer (monounsaturated comonomer) copolymerizable with the vinylidene chloride monomer such as vinyl chloride, alkyl acrylates, alkyl methacrylates, acrylic acid, methacrylic acid, itaconic acid, acrylonitrile, and methacrylonitrile.

This invention is applicable to vinylidene chloride polymers, particularly alkyl acrylate/vinylidene chloride polymers (acrylate PVDC). The vinylidene chloride polymer has monomer units (mer units) from vinylidene chloride and at least one alkyl acrylate. Such alkyl acrylates preferably include alkyl acrylates having alkyl groups of from 1 to 5 carbon atoms and combinations thereof, preferably methyl acrylate, ethyl acrylate, or butyl acrylate, or combinations thereof, more preferably methyl or butyl acrylate, or combinations thereof, most preferably methyl acrylate. In an alternative embodiment, the vinylidene chloride polymer optionally also has at least one additional mono-unsaturated monomer polymerizable with vinylidene chloride and an alkyl acrylate, such as alkyl methacrylates, acrylic acid, methacrylic acid, itaconic acid, acrylonitrile, methacrylonitrile, and combinations thereof, preferably alkyl methacrylates, acrylic acid, methacrylic acid, itaconic acid, acrylonitrile, methacrylonitrile, or combinations thereof.

The alkyl acrylate is advantageously present in amounts (as mole percent based on total polymer weight) of at least about 3.4, preferably present in amounts of at least about 3.9, more preferably at least about 4.5 and most preferably at least about 4.7. Independently, the alkyl acrylate advantageously present in amounts of at most about 6.7, preferably at most about 6.5, more preferably at most about 6.3 and most preferably at most about 6.0 mole percent of the polymer. The remainder of the monomer content of the vinylidene chloride polymer is preferably vinylidene chloride, but in an alternative embodiment a second alkyl acrylate is present in an amount less than that of the first alkyl acrylate, preferably butyl acrylate when the first alkyl acrylate is methyl acrylate. Preferences for the amounts of combined alkyl acrylates are those previously listed for alkyl acrylate. In a second alternative, but not preferred, embodiment at least one additional mono-unsaturated monomer polymerizable with vinylidene chloride and at least one alkyl acrylate, optionally present in amounts less than the amounts of alkyl acrylate, preferably at most about 5.5, more preferably at most about 2.0 and most preferably at most about 1.0 mole percent based on weight of total polymer.

The vinylidene chloride and the comonomer or combinations thereof are conveniently combined by polymerization, preferably suspension polymerization. The process includes at least a step of (a) contacting a composition comprising at least one vinylidene chloride and at least one alkyl acrylate and (b) exposing them to conditions effective for polymerization thereof. The polymerization is within the skill in the art such as taught by U.S. Pat. No. 2,968,651, U.S. Pat. No. 3,007,903, U.S. Pat. No. 3,879,359, and U.S. Pat. No. 6,627,679 except that specific monomers and monomer compositions necessary to achieve the desired polymer compositions are used along with and specific selections of polymerization conditions including; time, temperature, initiators to achieve the desired molecular weights.

Advantageously, the polymerization is carried out such that the vinylidene chloride polymer has a weight average molecular weight advantageous for effective viscosity during extrusion, film durability, and manufacturing productivity. Molecular weight in excess of that advantageous for viscosity and durability reduces manufacturing productivity. The molecular weight is advantageously at least about 50,000, preferably at least about 70,000, more preferably at least about 80,000, most preferably at least about 90,000 Daltons. The molecular weight is preferably at most about 200,000, more preferably at most about 150,000, most preferably at most about 130,000.

Compositions containing at least one vinylidene chloride copolymer according to the practice of the invention preferably additionally contain at least one plasticizer, more preferably at least 2 plasticizers. At least one of the plasticizers is preferably an epoxy plasticizer, that is, a plasticizer having at least one epoxy group per molecule. The epoxy plasticizers include epoxidized soybean oil, epoxidized linseed oil, epoxidized sunflower oil, epoxidized vegetable oils, and other epoxidized triglycerides and combinations thereof, preferably epoxidized vegetable oils, epoxidized linseed oil, epoxidized soybean oil and combinations thereof, more preferably epoxidized soybean oil. At least one plasticizer is preferably not an epoxy plasticizer and is more preferably an ester plasticizer, most preferably an aliphatic ester plasticizer. The ester plasticizers include dibutyl sebacate, acetyl tributyl citrate (ATBC), other citrate esters, other polymeric or high molecular weight ester oils, advantageously having a molecular weight of at least about 300 and combinations thereof, preferably dibutyl sebacate, acetyl tributyl citrate and combinations thereof, more preferably dibutyl sebacate.

The total amount of plasticizers is preferably at least about 4, more preferably at least about 5, most preferably at least about 6 percent, or independently preferably at most about 9, more preferably at most about 8, most preferably at most about 7 percent plasticizer based on total weight of the polyvinylidene chloride composition. Of this, an amount of preferably at most about 3.5, more preferably at most about 3.0, most preferably at most about 2.5, or independently at least about 0.5, more preferably at least about 1.0, most preferably at least about 1.5 percent based on total weight of the polyvinylidene chloride composition is preferably epoxidized oil plasticizer. In the practice of the invention at least two types of plasticizer are preferably present, more preferably at least one epoxy plasticizer and at least one ester plasticizer. The ester plasticizer or combination of ester plasticizers preferably makes up the remainder of the preferred amount of total plasticizer.

Furthermore, in one preferred embodiment, the practice of the invention involves addition of methacrylic polymer to achieve more affinity for ink than is achieved in its substantial absence, that is, in the same formulation except without added methacrylic polymer. The methacrylic polymer is a polymer preparable from monomers comprising at least one alkyl methacrylate monomer, or a combination thereof, optionally with at least one alkyl acrylate or styrenic monomer or a combination thereof; that is, having mer units from the alkyl methacrylate monomer or monomers and optionally from alkyl acrylate monomer or monomers. Preferably, the methacrylic polymer comprises methyl methacrylate, more preferably in an amount of at least about 30, more preferably at least about 40, most preferably at least about 50 weight percent, and at least one additional methacrylic or acrylic alkyl ester or styrenic monomer or combination thereof, more preferably comprising at least one additional methacrylic or acrylic alkyl ester. The alkyl groups of the alkyl acrylate and methacrylate monomers have at least 1 carbon atom, or independently preferably at most about 16 carbon atoms, more preferably at most about 8, most preferably at most about 4 carbon atoms. Preferred methacrylate and acrylate ester monomers, especially for copolymerization or interpolymerization with methyl methacrylate include such monomers as methyl acrylate, ethyl acrylate, butyl acrylate, ethyl methacrylate, butyl methacrylate and combinations thereof. Preferred styrenic monomers include such monomers as styrene, alpha methyl styrene, para methyl styrene, para tert-butyl styrene and combinations thereof. Methacrylate and acrylate monomers and combinations thereof are more preferred.

The methacrylic polymer advantageously has a molecular weight effective in improving affinity for ink, preferably a molecular weight of at least about 100,000, more preferably at least about 150,000 and most preferably at least about 200,000, or independently preferably at most about 4,000,000, more preferably at most about 700,000, most preferably at most about 400,000 Daltons. Similarly, the glass transition temperature is advantageously in a range effective for increasing affinity for ink. The methacrylic polymer preferably has at least one glass transition temperature of less than about 105° C., more preferably less than about 95° C., or independently preferably at least about 30° C. More preferably, the methacrylic polymer has one glass transition temperature between about 30° C. and about 105° C., more preferably between about 30° C. and about 95° C. and a second glass transition temperature, which is most preferably below about 40° C., more preferably below about 30° C. The methacrylic polymers are preferably produced by emulsion polymerization and are optionally either random or segmented copolymers leading to one or more glass transition temperatures.

In the practice of the present invention the methacrylic polymer, when used, is preferably present in an amount effective to achieve better affinity for ink than is achieved in its substantial absence, that is, in the same formulation except without added methacrylic polymer. Preferably the amount is at least about 0.5 percent, more preferably at least about 0.75 percent, most preferably at least about 1.0 percent, or independently advantageously at most about 4 percent, preferably at most about 3.5 percent, more preferably at most about 3.0 percent, most preferably at most about 2.5 percent by weight based on weight of the total vinylidene chloride polymer composition including additives and methacrylic polymer.

The methacrylic polymer is optionally added and admixed with the vinylidene chloride polymer as the other additives are added, for instance by mechanical admixing, or is coagulated onto the polyvinylidene chloride polymer as is within the skill in the art and is described in U.S. Pat. No. 6,627,679 which is incorporated herein by reference to the fullest extent permitted by law. Other additives are optionally combined with the methacrylic polymer and coagulated onto the vinylidene chloride polymer with it as described in U.S. Pat. No. 6,627,679.

Compositions useful in the practice of the invention, in some embodiments, include at least one low molecular weight vinyl chloride polymer useful for increasing affinity for ink. The vinyl chloride polymer is a polymer of preferably at least about 60, more preferably at least about 70, and most preferably at least about 80 weight percent vinyl chloride copolymerized with at least one ethylenically unsaturated comonomer copolymerizable with the vinyl chloride, preferably selected from the group consisting of vinyl acetate, alkyl acrylate, alkyl methacrylate, ethylene, styrenic monomer, acrylic acid, methacrylic acid, maleic acid and combinations thereof, more preferably from vinyl acetate, alkyl acrylate, alkyl methacrylate, ethylene, styrenic monomer, acrylic acid, methacrylic acid, maleic acid, and combinations thereof; and most preferably vinyl acetate, where the comonomer or combination thereof are present in an amount of preferably at least about 5, more preferably at least about 7, most preferably at least about 10, or independently preferably at most about 40, more preferably at most about 30, most preferably at most about 20 weight percent of the total low molecular weight vinyl chloride polymer.

The vinyl chloride polymer preferably has a molecular weight effective to increase the affinity of the polymer composition according to the practice of the invention for ink. The molecular weight is preferably at least about 10,000, more preferably at least about 15,000, most preferably at least about 20,000, or independently preferably at most about 70,000, more preferably at most about 50,000, most preferably at most about 30,000 Daltons. Such vinyl chloride polymers are also referred to hereinafter as "low molecular weight vinyl chloride polymers."

The low molecular weight vinyl chloride polymer or combination thereof, when used, is used in an amount effective to increase the affinity of the composition to ink as compared to the same composition except without the vinyl chloride polymer or combination of vinyl chloride polymers, preferably in an amount of at least about 0.5, more preferably at least about 0.75, most preferably at least about 1.0, or independently preferably at most about 3, more preferably at most about 2.7, most preferably at most about 2.5 weight percent of the total vinylidene chloride/alkyl acrylate polymer composition. The vinyl chloride polymer, like the methacrylic polymer, is added by means within the skill in the art for combining additives with polymers such as by mechanical mixing.

A variety of other additives within the skill in the art are optionally incorporated into the vinylidene chloride polymer. Additive type and amount will depend upon several factors. One such factor is the intended use of the composition. A second factor is tolerance of the composition for the additives. That is, amount of additive that can be added before physical properties of the blends are adversely affected to an unacceptable level. Other factors are apparent to those skilled in the art of polymer formulation and compounding.

Exemplary additives include heat or thermal stabilizers, acid scavengers, pigments, processing aids, lubricants, fillers, and antioxidants. Each of these additives is within the skill in the art and several types of each are commercially available. Preferably, the vinylidene chloride polymer composition, in addition to the additives according to the practice of the invention, contains only additives commonly used such as the listed types.

Exemplary lubricants include fatty acids, such as stearic acid; esters, such as fatty esters, wax esters, glycol esters, and fatty alcohol esters; fatty alcohols, such as n-stearyl alcohol; fatty amides, such as N,N'-ethylene bis stearamide; metallic salt of fatty acids, such as calcium stearate, and magnesium stearate; and polyolefin waxes, such as paraffinic, and oxidized polyethylene. Paraffin and polyethylene waxes and their properties and synthesis are described in 24

*Kirk-Othmer Encyc. Chem. Tech.* 3rd Ed., Waxes, at 473-77 (J. Wiley & Sons 1980), which is incorporated herein by reference.

Additives, including plasticizers, methacrylic polymers and vinyl chloride polymers, are conveniently incorporated into vinylidene chloride interpolymer compositions using any mixing process that does not have substantial adverse effects on the vinylidene chloride polymer or additives, preferably dry blending techniques, alternatively melt blending or other means within the skill in the art. It is within the practice of the invention to incorporate additives and components with the polymer and other additives in any sequence. Preferred methods of combining components include in-situ mixing of additives into the polymerization train during the polymerization or finishing steps of the vinylidene chloride interpolymer, dry blending of the finished vinylidene polymer with the additives in a post reaction operation with blenders of various configuration and mixing intensity, melt blending or cofeeding additives and the vinylidene interpolymer directly to an extruder and the like and combinations thereof.

Compositions of the polyvinylidene chloride/alkyl acrylate polymer as previously described comprising one or more of (1) at least one methacrylic polymer as previously described; (2) at least one low molecular weight vinyl chloride as previously described; or (3) from about 4 to about 9 weight percent plasticizer or combination thereof wherein epoxy plasticizers comprise at most about 3.5 weight percent of the composition are compositions according to the practice of the invention. The resulting vinylidene chloride polymer compositions are useful for any of the uses within the skill in the art for polyvinylidene chloride. They are especially useful for forming monolayer films, particularly monolayer films that are printable or printed. Such monolayer films are useful in many applications including, for instance, packaging, containers, sheet, laminate and the like or combinations thereof. In alternative embodiments the vinylidene chloride/alkyl acrylate composition is useful to form any article including monolayer or multilayer film, sheet, or article having the composition on an outer or exterior surface thereof (hereinafter vinylidene chloride surface), preferably wherein the vinylidene chloride surface is printed. Such articles are within the skill in the art, made using such techniques as molding, coextrusion, extrusion coating, vapor deposition coating, solvent coating, emulsion coating, or suspension coating, lamination, and the like. Additionally, the vinylidene chloride polymer compositions according to the practice of the invention, because they have greater affinity for materials such as inks, especially polar substances, are useful for lamination, coating, coextrusion, preferably where the vinylidene chloride polymer composition contacts a polar substance such as polyurethane, polyester, acrylates or acrylic copolymers and the like.

In the preferred embodiment where the article is a film, preferably a monolayer film, the film advantageously has a thickness of at least about 1 micron ($1 \times 10^{-6}$ m), preferably at least about 5 micron ($5 \times 10^{-6}$ m), more preferably at least about 7 micron ($7 \times 10^{-6}$ m), most preferably at least about 20 micron ($20 \times 1010^{-6}$ m). In most" common applications the thickness is advantageously at most about 500 micron ($500 \times 1010^{-6}$ m), preferably at most about 300 micron ($300 \times 1010^{-6}$ m), more preferably at most about 150 micron ($150 \times 1010^{-6}$ m).

The composition is advantageously used for film by at least one film forming method within the skill in the art. Preferably the film forming method is a film blowing method, more preferably a monolayer blown film method, most preferably a monolayer blown film method commonly known to those skilled in the art as the double-bubble method. For instance, processes within the skill in the art for forming film include those disclosed in A. T. Widiger, R. L Butler, in O. J. Sweeting, ed., *The Science and Technology of Polymer Films*, Wiley Interscience, New York, (1971); *Kirk-Othmer: Encyclopedia of Chemical Technology*, Fourth Edition, Vol. 24, New York, John Wiley & Sons Inc. 1997, pp. 912-913 and references cited therein. In one embodiment, the film blowing method preferably involves steps of (a) supplying a composition according to the practice of the invention; (b) extruding the composition through an annular die into a tube form; (c) quenching the extruded tube in a cold water bath; and (d) collapsing the tube into a tape form, preferably using a set of nip rolls, preferably at the bottom of the cold tank. In one embodiment, sizing of this tube and the width of the collapsed tape is provided by a volume of fluid (called the sock fluid) that is held inside this extruded tube by the set of nip rolls. The extruded tube with the sock fluid inside it, before being collapsed by the cold tank nip rolls, is the first bubble of the "double-bubble" process. The cold tank temperature is preferably chosen to optimize the crystallization nucleation of the poly(vinylidene chloride) copolymer. The collapsed tape is reheated as it exits the cold water tank by passing through a warm water tank, to heat it to a temperature that is conducive for crystal nucleus growth during the subsequent bubble blowing step. Then a stable bubble of the composition is formed into a film by entrapping air to push open the collapsed tape exiting the warm tank. This expanded bubble of the final film is the second bubble of the double-bubble process. The film bubble is collapsed and wound onto at least one roll. In a preferred embodiment, the steps include step (a) and at least three of steps (b) through (i) of: (a) supplying a composition according to the practice of the invention, (b) extruding the composition into a tube form, (c) sizing the tube to attain a desired width of the collapsed tape using a volume of fluid held inside the extruded tube (d) quenching the extruded tube, (e) collapsing the tube into a tape form, (f) reheating the collapsed tape in a warm tank, (g) forming a bubble of the composition, (h) collapsing the film bubble, and (i) winding the resulting film onto at least one roll. The term "stable bubble" means a bubble that does not vary unacceptably in size or shape over time in the second bubble of the process.

In one preferred embodiment, the film, particularly a monolayer film, is useful to make at least one sausage casing, often referred to as a chub. A sausage casing utilizes such properties of the compositions according to the practice of the invention as film durability, barrier properties, shrink, and adhesiveness to contents of the casing. In one embodiment, the film shrinks when heated to fit tightly about the contents and adheres sufficiently to avoid bubbles that might lead to deterioration of the contents. Making sausage casings advantageously comprises (a) folding a strip of film, (b) sealing to form a side seam, (c) filling the resulting tube, and (d) cutting and closing at intervals. The strip is preferably continuous for lengths of at least about 750 m. The intervals are preferably regular. Formation of sausage casings is by any means within the skill in the art, for instance as taught by U.S. Pat. No. 6,713,105 B1 and European Patent 0029316 AI.

While compositions according to the practice of the invention preferably have increased affinity for ink, it is believed that the same properties result in enhanced affinity for coatings other than ink, to adjacent polymer layers, for instance applied by lamination, to substrates and in coextrusion.

Objects and advantages of this invention are further illustrated by the following examples. The particular materials and amounts thereof, as well as other conditions and details, recited in these examples should not be used to limit this invention. Rather they are illustrative of the whole invention. Unless stated otherwise all percentages, parts and ratios are by weight. Examples of the invention are designated numerically while comparative samples, which are not examples of the invention, are designated alphabetically.

EXAMPLES AND COMPARATIVE SAMPLE

Comparative Sample A and Examples 1-7

A copolymer of 94.6 mole percent vinylidene chloride and 5.4 mole percent methyl acrylate and films thereof are prepared using procedures disclosed in WO2006044113 A1, especially Example 1, (US Publication 2009 123678 A1 which is incorporated herein by reference in its entirety to the fullest extent permitted by law), except that the comonomer is 5.4 mole percent methyl acrylate and that the additives are adjusted as indicated in Table 1. In Table 1, all additives to the polymer except plasticizers, methacrylate polymers and vinyl chloride polymers are referred to as processing aids. The amounts of epoxidized soy bean oil are total amounts including that remaining from polymerization (0.15%) and that added to the polymer. The amount of ester plasticizer indicated in Table 1 is added to the polymer composition as dibutyl sebacate (DBS). The methacrylate polymer is a polymer of 19 weight percent butyl acrylate, 29 weight percent butyl methacrylate, and 53 weight percent methyl methacrylate, with an error of 10 percent and having a weight average molecular weight of 223,000, with a standard deviation of 4000, commercially available from Arkema under the trade designation Plastistrength L 1000. The low molecular weight vinyl chloride polymer is a polymer of 86 weight percent vinyl chloride and 14 weight percent vinyl acetate having a molecular weight of about 14,000 commercially available at the time of the experiment from The Dow Chemical Company under the trade designation VYHH. This polymer can also be made as disclosed in "Encyclopedia of PVC, $2^{nd}$ ed, vol. 1, pg 213-215, published by Marcel Dekker inc., 1986. This reference further cites U.S. Pat. No. 2,064,565 and U.S. Pat. No. 2,075,429. Amounts of plasticizer, vinyl chloride polymer and methacrylic polymer are indicated in Table 1.

TABLE 1

PVDC COMPOSITIONS TESTED

| Example (EX) or Comparative Sample* (CS) | % ESO epoxy | % DBS ester | % vinyl chloride polymer | % methacrylate polymer | Process aids |
|---|---|---|---|---|---|
| CS A* | 4.9 | 2 | 0 | 0 | yes |
| EX 1 | 1.15 | 4.25 | 0 | 0 | yes |
| EX 2 | 4.9 | 2 | 0 | 1 | no |
| EX 3 | 3.15 | 3 | 0 | 1 | no |
| EX 4 | 1.15 | 4.25 | 0 | 1 | no |
| EX 5 | 3.15 | 3 | 0 | 2 | no |
| EX 6 | 3.15 | 3 | 2 | 0 | yes |
| EX 7 | 3.15 | 3 | 2 | 1 | no |

*Comparative Sample is not an example of the invention.

The extruded films are printed with three solvent based inks commercially available from Jiaozuo Maoyuan Special ink Manufacturing Co., Ltd. These white, black and red inks are known to have relatively poor adhesion to vinylidene chloride/methyl acrylate copolymer films but good adhesion to vinylidene chloride/vinyl chloride copolymers. A Pamarco Hand Proofer with a 250 line anilox roller is used according to manufacturer's directions to print the films. Film samples without uniform color density are discarded.

Twenty four (24) hours after the printing, ink adhesion is tested by tape adhesion, rub resistance, and scratch resistance tests. For the tape test, a strip of tape commercially available from 3M (Minnesota Mining and Manufacturing) under the trade designation 3M No. 600, approximately 150 mm in length is applied to the printed surface by hand and is smoothed out to remove any air trapped between the tape and the ink. After 5 seconds, the strip is removed and the amount of ink removed is determined by visually inspecting the ink on the tape and comparing it with printed samples with known amounts of ink coverage. For the scratch test, the printed surface is scratched by rubbing using the edge of the index fingernail with force of approximately 3 Newtons applied by hand for 10 strokes, in a single direction. Amount of loss is determined by visual inspection. Any area showing complete removal of the ink without plastic deformation of the film is considered a failure. For the rub resistance test, the printed surface is rubbed with a piece of uncoated paper, basis weight 34 grams/meter$^2$, with a force of about 1500 grams applied through the pad of the thumb. The test consists of 10 strokes in the same direction. Failure is defined as the complete removal of ink in any portion of the area that was rubbed. These tests are as described in *Flexography Principles and Practices,* 4th edition, published by the foundation of the Flexographic Technical Association, pages 354-358 (1991) except that the tape adhesion test differs from the published guidelines in that 3M No. 600 tape is used rather than No. 610. The rub resistance test differs from the published guidelines in that the rubbing is in one direction only rather than oscillating back and forth. It is more important that such details of the test be consistent throughout a series of tests, the results of which are to be compared, than that such details conform to the published guidelines since results are comparative.

Results of the tape test are shown in Table 2: The tape adhesion test is repeated as in Comparative Sample A with the results shown in Table 2.

TABLE 2

RESULTS OF TAPE ADHESION TEST

| Example (EX) or Comparative Sample* (CS) | AVERAGE INK LOSS % | WHITE % | BLACK % | RED % |
|---|---|---|---|---|
| CS* A | 83 | 90 | 80 | 80 |
| EX 1 | 62 | 90 | 80 | 15 |
| EX 2 | 70 | 80 | 80 | 50 |
| EX 3 | 28 | 3 | 20 | 60 |
| EX 4 | 28 | 20 | 60 | 5 |
| EX 5 | 32 | 80 | 5 | 10 |
| EX 6 | 67 | 90 | 80 | 30 |
| EX 7 | 43 | 60 | 40 | 30 |

Comparative Sample is not an example of the invention.

The data in Table 2 shows that use of less than 4.9 weight percent epoxidized plasticizer (using an ester plasticizer to make up the amount needed to attain other useful properties) or use of methacrylic polymer even with 4.9 weight percent epoxidized soy bean oil, or use of low molecular weight vinyl polymer each result in less loss of ink than does use of 4.9 weight percent epoxidized soy bean oil in combination with other plasticizer in a vinylidene chloride composition. Furthermore, variation in use of process aids shows that this result is obtained whether or not common processing aids are used.

Embodiments of the invention include the following:
1. A polymer composition of at least one vinylidene chloride/alkyl acrylate polymer having from about 3.4 to about 6.7 mole percent of mer units derived from at least one alkyl acrylate monomer polymerized with the vinylidene chloride comprising a plasticizer and having a least one of the following compositional characteristics: (1) at least one low molecular weight vinyl chloride polymer having a molecular weight of at most about 70,000 Daltons in an amount sufficient to increase affinity for at least one ink; and (2) at least one methacrylic polymer in an amount sufficient to increase the affinity for at least one ink.
2. A polymeric surface producible from a composition of Embodiment 1.
3. An article comprising Embodiment 2 as at least a portion of its surface, that is an article having at least a portion of its surface producible or made from at least one composition of Embodiment 1.
4. The article of Embodiment 3 which comprises monolayer film or sheet made from the composition of Embodiment 1, a multilayer film, sheet or laminate having an external, exterior or outer layer made from a composition of Embodiment 1, an article molded or fabricated from a composition of Embodiment 1 or comprising a part made from a composition of Embodiment 1, an article at least partially coated with a composition of Embodiment 1. Each of these articles is also separately preferred in alternative embodiments.
5. An article comprising a composition of Embodiment 1 laminated to, coextruded with, or as a coating on another polymer or other material.
6. An article of any previous embodiment wherein the article is a package, a part of a package, overwrap, sausage casing, bag, other container or part thereof.
7. The film, article, or surface of any of the preceding embodiments wherein at least one surface comprising or producible from a composition of Embodiment 1 has more affinity for or adhesion to at least one ink than does a film, article or surface of the same composition except without the methacrylic polymer, the vinyl chloride polymer or with more than about 3.5 weight percent epoxy plasticizer.
8. The film, article, or surface of any of the preceding embodiments having ink or printing thereon.
9. A process of printing comprising applying ink to a surface comprising a composition of any other embodiment or an article, film or surface of any other embodiment in this list of embodiments.
10. The composition, article, surface, film, or process of any previous embodiment wherein the amount of alkyl acrylate comonomer in the vinylidene chloride polymer is at least about any of 3.4, 3.9, 4.5, or 4.7 mole percent.
11. The composition, article, surface, film, or process of any previous embodiment wherein the amount of alkyl acrylate comonomer in the vinylidene chloride polymer is at most about any of 6.7, 6.5, 6.3, or 6.0 mole percent.
12. The composition, article, surface, film, or process of any previous embodiment wherein the alkyl acrylate comonomer in the vinylidene chloride polymer is selected from at least one of butyl acrylate, ethyl acrylate, or methyl acrylate, preferably butyl acrylate or methyl acrylate or a combination thereof, more preferably methyl acrylate.
13. The composition, article, surface, film, or process of any previous embodiment wherein the total amount of plasticizer is at most about any of 9, 8, or 7 weight percent of the polymer composition including plasticizer.
14. The composition, article, surface, film, or process of any previous embodiment wherein the total amount of plasticizer is at least about any of 4, 5, 6, weight percent of the polymer composition including plasticizer.
15. The composition, article, surface, film, or process of any previous embodiment wherein the total plasticizer includes at least one epoxy plasticizer, preferably wherein the epoxy plasticizer is selected from epoxidized soybean oil, epoxidized linseed oil, epoxidized sunflower oil, epoxidized vegetable oils, other epoxidized triglycerides and combinations thereof; more preferably epoxidized vegetable oils, epoxidized linseed oil, epoxidized soybean oil and combinations thereof, most preferably epoxidized soybean oil.
16. The composition, article, surface, film, or process of any previous embodiment wherein at least one epoxy plasticizer is present in an amount of at most about any of 3.5, 3.0, or 2.5 weight percent based on total polymer composition.
17. The composition, article, surface, film, or process of any previous embodiment wherein at least one epoxy plasticizer is present in an amount of at least about any of 0.5, 1.0, or 1.5 weight percent based on total polymer composition.
18. The composition, article, surface, film or process of any previous embodiment wherein the composition additionally comprises at least one ester plasticizer preferably selected from dibutyl sebacate, acetyl tributyl citrate (ATBC), other citrate esters, other polymeric or high molecular weight ester oils, advantageously having a molecular weight of at least about 300 and combinations thereof, more preferably dibutyl sebacate, acetyl tributyl citrate and combinations thereof, most preferably dibutyl sebacate.
19. The composition, article, surface, film, or process of any previous embodiment wherein the composition comprises at least one methacrylic polymer and the methacrylic polymer comprises (mer units from) methyl methacrylate, preferably in an amount of at least about any of 30, 40, or 50 weight percent based on weight of methacrylic polymer.
20. The composition, article, surface, film, or process of any previous embodiment wherein the methacrylic polymer comprises (mer units from) methyl methacrylate and additionally comprises (mer units from) at least one alkyl acrylate, methacrylic monomer other than methyl methacrylate, styrenic monomer or a combination thereof, preferably comprising at least one additional methacrylic or acrylic alkyl ester, independently preferably having alkyl groups of preferably at least either 1 or 2 carbon atoms, or independently at most any of 16, 8 or 4 carbon atoms, most preferably selected from methyl acrylate, ethyl acrylate, butyl acrylate, ethyl methacrylate, butyl methacrylate and combinations thereof.
21. The composition, article, surface, film, or process of any previous embodiment wherein the methacrylic polymer has a molecular weight of at least about any of 100,000, 150,000, or 200,000; or independently of at most about any of 700,000 or 400,000 Daltons.

22. The composition, article, surface, film, or process of any previous embodiment wherein the methacrylic polymer has a glass transition temperature of at most about 105° C. or 95° C., or independently preferably at least about 30° C.

23. The composition, article, surface, film, or process of any previous embodiment wherein the amount of methacrylic polymer is at least about any of 0.5, 0.75, or 1.0 weight percent based on weight of total polymer composition; or independently at most about any of 3.5, 3.0, or 2.5 weight percent.

24. The composition, article, surface, film, or process of any previous embodiment wherein the composition comprises at least one vinyl chloride polymer and the vinyl chloride polymer comprises (mer units from) vinyl chloride and from at least one of vinyl acetate, alkyl acrylate, alkyl methacrylate, ethylene, styrenic monomer, acrylic acid, methacrylic acid, or maleic acid; more preferably from vinyl acetate or alkyl acrylate, alkyl methacrylate, ethylene, styrenic monomer, acrylic acid, methacrylic acid, maleic acid and combinations thereof; from most preferably vinyl acetate.

25. The composition, article, surface, film, or process of any previous embodiment wherein the composition comprises at least one vinyl chloride polymer having a comonomer or combination thereof present in an amount of at least about any of 5, 7, or 10 weight percent; or independently at most about any of 40, 30 or 20 weight percent based on weight of vinyl chloride polymer.

26. The composition, article, surface, film or process of any previous embodiment wherein the vinyl chloride polymer has a molecular weight of at least about any of 15,000 or 20,000, or independently at most about any of 30,000, 50,000 or 70,000 Daltons.

27. The composition, article, surface, film, or process of any previous embodiment wherein the vinyl chloride polymer is present in an amount of at least about any of 0.5, 0.75, or 1.0; or independently preferably at most about any of 3, 2.7, or 2.5 weight percent based on total polymer composition.

The invention claimed is:

1. A polymer surface preparable from a polymer composition of at least one vinylidene chloride/alkyl acrylate polymer having from about 3.4 to about 6.7 mole percent of mer units derived from at least one alkyl acrylate monomer polymerized with the vinylidene chloride; and comprising a plasticizer and at least one low molecular weight vinyl chloride polymer having a molecular weight of at most about 70,000 Daltons in an amount of from about 0.5 to about 3 weight percent based on total polymer composition, which is sufficient to increase affinity for at least one ink.

2. The polymer surface of claim 1 which has more affinity for or adhesion to at least one ink than does a film, article or surface of the same composition except without the vinyl chloride polymer.

3. The polymer surface of claim 1 wherein the alkyl acrylate is methyl acrylate.

4. The polymer surface of claim 1 wherein the composition comprises at least one epoxy plasticizer and at least one ester plasticizer and the ester plasticizer or combination thereof is selected from dibutyl sebacate, acetyl tributyl citrate (ATBC), other citrate esters, other polymeric or high molecular weight ester oils, and combinations thereof.

5. The polymer surface of claim 4 having printing thereon.

6. The polymer surface of claim 1 wherein the amount of total plasticizer is from about 4 to about 9 weight percent based on polymer composition including from about 0.5 to about 3.5 weight percent based on weight of polymer composition of an epoxy plasticizer or combination of epoxy plasticizers.

7. The polymer surface of claim 6 having printing thereon.

8. The polymer surface of claim 1 wherein the low molecular weight vinyl chloride polymer is present in an amount of from about 0.75 to about 2.7 weight percent based on total polymer composition.

9. The polymer surface of claim 1 further comprising at least one methacrylic polymer, wherein the methacrylic polymer has a molecular weight of about 100,000 to about 400,000 and is a copolymer of methyl methacrylate and at least one of: an alkyl acrylate, different methacrylic monomer, styrenic monomer or a combination thereof in an amount of from about 50 to about 70 weight percent of the methacrylic polymer.

10. The polymer surface of claim 1 wherein the vinyl chloride polymer has a molecular weight of from about 15,000 to about 50,000 Daltons and a comonomer selected from vinyl acetate, alkyl acrylate, alkyl methacrylate, ethylene, styrenic monomer, acrylic acid, methacrylic acid, maleic acid, and a combination thereof.

11. The polymer surface of claim 1 having printing thereon.

12. An article comprising the surface of claim 1 as at least a portion of its surface.

13. The article claim of 12 which comprises at least one monolayer film or sheet, multilayer film, sheet or laminate, a molded or fabricated article, or a coated article.

14. A process of printing comprising applying ink to a surface of claim 1.

* * * * *